F. O. DESCHAMPS.
Driving, Coupling, and Braking Appliance for Railway-Cars.
No. 206,093.                    Patented July 16, 1878.
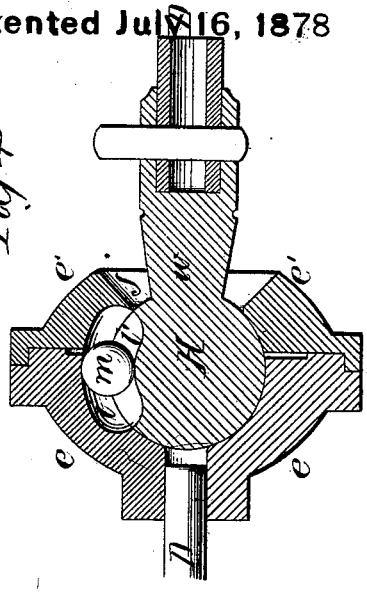
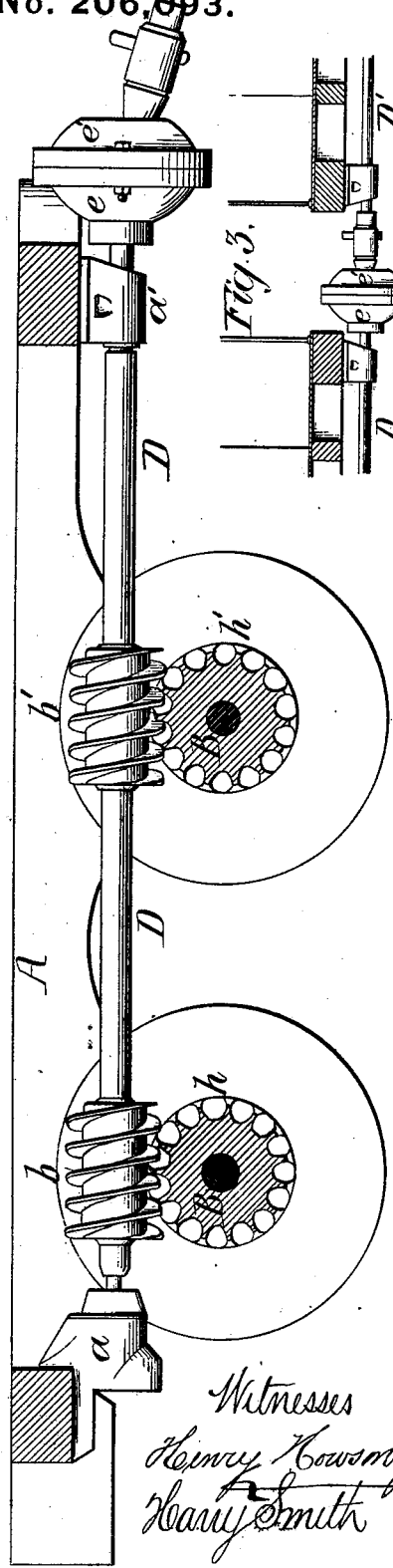
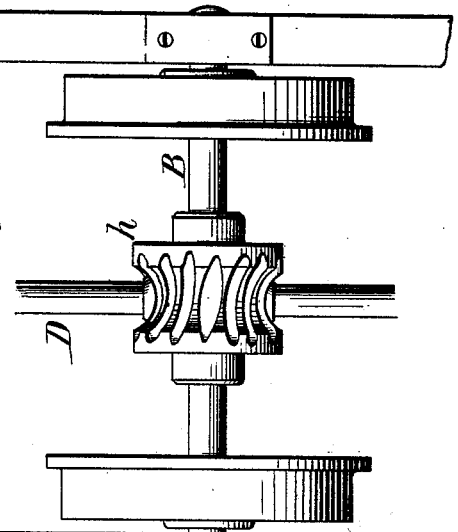
Witnesses
Henry Howson Jr
Harry Smith
Inventor
Francis O. Deschamps
by his Attorneys
Howson and Son

UNITED STATES PATENT OFFICE.

FRANCIS O. DESCHAMPS, OF PHILADELPHIA, PENNSYLVANIA.

IMPROVEMENT IN DRIVING, COUPLING, AND BRAKING APPLIANCES FOR RAILWAY-CARS.

Specification forming part of Letters Patent No. 206,093, dated July 16, 1878; application filed October 1, 1877.

*To all whom it may concern:*

Be it known that I, FRANCIS O. DESCHAMPS, of Philadelphia, Pennsylvania, have invented a new and useful Improvement in Driving, Coupling, and Braking Appliances for Railroad-Cars, of which the following is a specification:

The object of my invention is to provide railroad-cars with appliances through the medium of which the axles and wheels may be driven, the cars coupled together, and the motion of the cars arrested, all substantially as described hereinafter.

In the accompanying drawings, Figure 1 is a vertical section of a car or car-truck with driving and coupling appliances; Fig. 2, a bottom plan of driving-gear; Fig. 3, a reduced view, and Fig. 4 an enlarged view, of the coupling device.

A is the frame of a car, or it may be the frame of the truck, having at the top springs on which the body of the car rests. B B are the axles, having journals, adapted to hangers, secured to the frame, on the under side of which are two bearings, $a$ $a'$, one at the front and the other at the rear, for a central longitudinal shaft, D, the latter carrying two worms, $b$ $b'$, which are adapted to worm-wheels $h$ $h'$ on the axles.

It may be remarked here that the car is intended mainly for city or suburban railroads, on which the travel is not at a very high rate of speed, and that I prefer a fast-running rotary engine for the direct driving of the shaft D to the ordinary engines.

If the car is used for street-railways, the engine and boiler may be placed on the frame at or near one end of the same, the shaft D being operated directly by the engine or through the intervention of gearing.

I prefer, however, in most cases to make the engine separate from the car, or, in other words, to have a separate truck devoted to the engine and boiler, the driving-shaft of the engine being central and in line with the central shaft D of the car, and the two shafts being connected together by the ball-and-socket coupling shown in Fig. 3. This shaft D terminates at the front end in a hollow hemisphere, $e$, to which is secured another hollow hemisphere, $e'$, having a central opening, $f$, for the stem $w$ of a ball, H, which stem is secured to the shaft of the engine, the said ball being adapted to the spherical space within the combined hemispheres.

A small solid sphere, $m$, is contained, one half in a groove, $i$, in the interior of the socket formed by the two hemispheres, and the other half in a coinciding groove, $i'$, formed in the ball H, as shown in Fig. 3.

While the sphere $m$ and the grooves permit the two shafts to assume any angle in any direction in respect to each other to an extent determined by the size of the opening $f$, the said sphere effectually prevents one shaft from turning independently of the other; hence the engine-truck can move laterally or vertically or to any angle in respect to the car without interfering with the driving of the shaft D from the shaft D'.

Any number of cars with driving appliances similar to that described may have their driving-shafts thus coupled together.

As all the wheels of all the cars are drivers, my invention may be adopted with advantage by contractors in grading new roads, or my invention may be applied to the rolling-stock of mountain or mineral roads, or in districts where railroads have of necessity steep grades; in fact, my invention may be adopted wherever it is usual to run cars at comparatively low rates of speed.

No braking apparatus is required in connection with the cars other than that which the engine and driving appliances afford, for the moment the engine is stopped the wheels and axles are effectually locked by the worm and worm-wheels.

In some cases it may be advisable to drive but one axle from the horizontal shaft, but in most instances I prefer to have both axles of the car or truck driven.

In view of the state of the art I do not desire to claim, broadly, the driving of the axle of a car from a horizontal shaft by means of a worm on the latter and worm-wheel on the former; but

I claim as my invention—

1. The combination, in a railroad-car or car-truck, of a horizontal shaft, the axle or axles, and intervening worm and worm-wheel gearing, through the medium of which the axle or axles are driven by the shaft, with a universally-jointed coupling, through which the horizontal shaft of one car or truck is driven from that of the adjoining car or truck, all substantially as set forth.

2. The within-described coupler and driver, consisting of a socket, $e$ $e'$, on one shaft, a ball, H, on the adjoining shaft, and a sphere, $m$, contained within a chamber formed by a groove in the socket and a coinciding groove in the ball, substantially as described.

In testimony whereof I have signed my name to this specification in the presence of two subscribing witnesses.

FRANCIS O. DESCHAMPS.

Witnesses:
HERMANN MOESSNER,
HARRY SMITH.